US010421162B2

(12) United States Patent
Menonna et al.

(10) Patent No.: US 10,421,162 B2
(45) Date of Patent: Sep. 24, 2019

(54) DEVICE FOR HEATING A PLURALITY OF FUNCTIONAL ELEMENTS

(71) Applicants: Mahle International GmbH, Stuttgart (DE); Maschinenbau-Service-Automatisierungstechnik Chemnitz GmbH, Chemnitz (DE)

(72) Inventors: Antonio Menonna, Ditzingen (DE); Stefan Morgenstern, Niederwiesa (DE); Roland Schacherer, Geisingen (DE)

(73) Assignees: Mahle International GmbH (DE); Maschinenbau-Service-Automatisierungstechnik Chemnitz GmbH (DE)

( * ) Notice: Subject to any disclaimer, the term of this patent is extended or adjusted under 35 U.S.C. 154(b) by 324 days.

(21) Appl. No.: 15/335,049

(22) Filed: Oct. 26, 2016

(65) Prior Publication Data
US 2017/0113309 A1  Apr. 27, 2017

(30) Foreign Application Priority Data
Oct. 27, 2015 (DE) .................... 10 2015 220 979

(51) Int. Cl.
*B23Q 16/00* (2006.01)
*B23P 11/02* (2006.01)
(Continued)

(52) U.S. Cl.
CPC ............ *B23P 11/025* (2013.01); *B23Q 16/00* (2013.01); *F01L 1/047* (2013.01); *H05B 6/101* (2013.01);
(Continued)

(58) Field of Classification Search
CPC ................ B23P 11/025; F01L 2103/01; Y10T 29/49293
See application file for complete search history.

(56) References Cited

U.S. PATENT DOCUMENTS 4,468,549 A * 8/1984 Arnosky ............... H05B 6/102
219/637
4,616,389 A * 10/1986 Slee ...................... B23P 11/025
29/447
(Continued)

FOREIGN PATENT DOCUMENTS

DE      102004049272 A1   4/2006
DE   10 2008 064 194 A1   7/2010
(Continued)

OTHER PUBLICATIONS

English Translation DE102013117021A1 (Year: 2013).*
(Continued)

*Primary Examiner* — Jason L Vaughan
*Assistant Examiner* — Amanda Kreiling
(74) *Attorney, Agent, or Firm* — Fishman Stewart PLLC

(57) ABSTRACT

A device for heating a plurality of functional or receiving elements, such as a cam, balancing mass, gearwheel and/or a bearing, may include a plurality of holding balconies disposed above one another along an axis each associated with a respective receiving element, a plurality of workstations includes a loading station, a heating station and an unloading station, and an induction heating device including a plurality of accommodation elements. The plurality of holding balconies may be individually movable in an axial direction of an axis, and/or having a greater spacing in the axial direction with respect to one another in the loading station and/or the unloading station than in the heating station. The plurality of accommodation elements may be jointly adjustable in the axial direction.

20 Claims, 2 Drawing Sheets

(51) Int. Cl.
  *F01L 1/047* (2006.01)
  *H05B 6/10* (2006.01)
  *H05B 6/44* (2006.01)
  *F16B 4/00* (2006.01)

(52) U.S. Cl.
  CPC ............ *H05B 6/44* (2013.01); *B23P 2700/02* (2013.01); *F01L 2001/0471* (2013.01); *F01L 2103/01* (2013.01); *F16B 4/006* (2013.01)

(56) References Cited

U.S. PATENT DOCUMENTS

2012/0131790 A1* 5/2012 Schacherer ......... B23B 31/1179
                                                    29/557
2014/0196552 A1   7/2014 Beerens et al.

FOREIGN PATENT DOCUMENTS

| DE | 102013200638 A1 | 7/2014 | |
| DE | 102013211702 A1 * | 12/2014 | ............ F01L 1/047 |
| EP | 2756917 A1 | 7/2014 | |
| JP | H11210413 A | 8/1999 | |
| JP | 2000061749 A | 2/2000 | |
| JP | 2000073709 A | 3/2000 | |
| WO | WO-2014/111472 A1 | 7/2014 | |

OTHER PUBLICATIONS

German Search Report dated May 15, 2017 related to corresponding German Patent Application No. 10 2015 220 979.2.
European Search Report dated Mar. 13, 2017 related to corresponding European Patent Application No. 16194359.2.
English abstract for DE-10 2008 064 194A1.

* cited by examiner

DEVICE FOR HEATING A PLURALITY OF FUNCTIONAL ELEMENTS

CROSS-REFERENCE TO RELATED APPLICATIONS

This application claims priority to German Patent Application No. 102015220979.2, filed Oct. 27, 2015, the contents of which are hereby incorporated by reference in its entirety.

TECHNICAL FIELD

The present invention relates to a device for heating a plurality of functional elements each comprising a cutout for a shaft, in particular cams, balancing masses, gearwheels and/or bearings. The invention also relates to a method for heating such functional elements.

BACKGROUND

In order to joint functional elements, in particular cams, on a shaft, in particular on a camshaft tube, the functional elements usually have to be heated and the hubs or cutouts of the individual functional elements have to be aligned with the axis of the shaft. If a plurality of functional elements are to be jointed simultaneously in one go by introducing the shaft, all the functional elements must be correspondingly aligned.

A device suitable for this purpose for positioning a plurality of functional elements comprising a cutout for a shaft, in particular cams, in a predetermined angular position on the shaft is known from DE 10 2008 064 194 A1, wherein the device comprises a plurality of accommodation elements each intended for a functional element. The accommodation elements can be positioned such that the cutouts of the functional elements essentially lie on a common straight line.

Camshafts are usually also produced by means of the device described above, wherein the cams or generally functional elements are fixed on a shaft tube by means of thermal jointing. Such a thermal jointing process requires however heating of the functional elements to be jointed and/or cooling of the shaft tube. In particular, the heating of the functional elements that is normally employed requires a large amount of heating energy, as a result of which the production process is becoming increasingly expensive for such a product.

SUMMARY

The present invention deals with the problem of providing a device for heating a plurality of functional elements on a shaft, said device in particular enabling energy saving and an improved operating sequence.

According to the invention, this problem is solved by the subject-matter of the independent claim(s). Advantageous embodiments are the subject-matter of the dependent claims.

The present invention is based on the general idea of constituting induction heating for the heating of functional elements to be jointed on a shaft by means of a thermal jointing process, in such a way that said induction heating preferably heats only the functional elements to be heated and not other components, such as for example holding balconies on which the functional elements lie. A huge energy saving can be achieved as a result of the concentrated and local heating solely of the functional elements, since the heating energy that was previously unnecessarily required for the heating of other components of the device, for example the holding balconies, now no longer arises. The device according to the invention for heating a plurality of functional elements each comprising a cutout for a shaft, for example cams, balancing masses, gearwheels and/or bearings, comprises the previously mentioned holding balconies each intended for a functional element, which are disposed vertically one above the other and on which the functional elements to be jointed are placed for heating. Moreover, the device according to the invention comprises a plurality of workstations, i.e. at least one loading station, at least one heating station and at least one unloading station. Moreover, the holding balconies are individually adjustable with respect to one another in the z direction, wherein the holding balconies in the loading station and in the unloading station have a greater spacing from one another than in the at least one heating station and gripping can thus take place more easily both in the loading station and in the unloading station. An induction heating device is provided for the heating of the functional elements, which device comprises an individual accommodation element for each functional element to be heated and which comprises a number of accommodation elements corresponding to the number of holding balconies, said accommodation elements being able to be adjusted jointly in the z direction. A gripping device can of course be disposed at the holding balconies, said gripping device fixing the functional elements to be heated during the heating. Extremely well targeted heating of the functional elements to be heated is possible as a result of an induction heating device specially designed in this way with the accommodation elements individually assigned to each of the individual functional elements, without the holding balcony on which the functional component to be heated lies also being heated at the same time. The induction heating device according to the invention with its accommodation elements thus enables heating solely of the functional elements and precisely not, as previously, additional components of the device, which are of no importance whatsoever for the actual subsequent jointing process, but necessitate an increased energy requirement. It is thus possible with the device according to the invention, by moving the individual holding balconies apart in the loading station and the unloading station, to grip the functional elements in a straightforward manner and thus to improve the operating sequence and to save energy through the localised heating of the functional elements.

The accommodation elements of the induction heating device can be constituted such that the functional element located therein in each case can preferably be accommodated with a precise fit or with only a small amount of play in such an accommodation element, wherein the respective accommodation element is also constituted such that it heats the functional element to be heated in a uniform manner, so that for example greater induction currents are conveyed through regions with greater material thickness, so that the heated functional element shrinks on the shaft as uniformly as possible during a cooling process. The accommodation elements can of course also enable accommodation of the functional elements to be heated without a precise fit, in particular when they are constituted as a ring inductor, this offering the great advantage that functional elements differing in size can be heated with one and the same accommodation element, as a result of which the flexibility with regard to the functional elements to be heated is increased. With the induction heating device according to the invention and, moreover, also with the device according to the invention, a marked energy saving can thus be achieved in the thermal jointing of control shafts, for example camshafts, as a result of which the production costs for such a control shaft can be markedly reduced and furthermore resources can be saved.

In an advantageous development of the solution according to the invention, at least one induction coil, for example a ring inductor, is disposed in each accommodation element. This makes it possible to control the accommodation elements individually, in particular to switch them on and off, and to regulate the heating power individually. By providing a plurality of induction coils, the creation of different temperature regions is possible during the heating in an accommodation element.

The device is expediently constituted as a rotary transfer system and comprises a rotary table with four workstations. A first and a second workstation can be constituted as loading stations, whilst a third workstation represents the heating station and a fourth workstation is constituted as an unloading station. The first and second workstation can of course also be combined, so that in this case the device constituted as a rotary transfer system would comprise only three stations. The functional elements to be heated are first removed from a magazine into the loading stations by means of a suitable robot and placed on the respective holding balconies of the device. The holding balconies to be loaded in each case are thereby moved apart and thus enable a simplified placing of the functional element. Once the functional elements have been placed on the respective holding balconies in the desired number, the holding balconies move together again in the z direction and the rotary table is rotated, so that the functional elements are now shifted from the loading station to the heating station, in which the induction heating device with the accommodation elements described in the preceding paragraphs is standing in a waiting position. Moving the holding balconies together in the heating station has the great advantage that the latter can be constituted in a more compact and therefore more energy-efficient manner. When the rotary transfer system has swivelled the functional elements (cams) into the heating station, the induction coils are moved closer to the cams or, in an embodiment as a ring inductor, the circular coils pass over the cams up to the midpoint of the cam height. After the heating, the coils (induction heating device) again move back upwards in the z direction, after which the cams are moved into the correct z position and are then transferred into the unloading station. They are removed there together by means of a device and transferred into a jointing device. The subsequent thermal jointing in the separate jointing device obviously only takes place if the detected temperature values do not fall below or above predefined limiting values, i.e. lie within a predefined temperature range camera great.

The present invention is thus also based on the general idea of providing an energy-saving process for heating functional elements, wherein the previously described device is used, which enables extremely targeted heating of the functional elements without further components being unnecessarily heated at the same time.

Further important features and advantages of the invention emerge from the sub-claims, from the drawings and from the associated description of the figures with the aid of the drawings.

It is understood that the features mentioned above and those yet to be described below can be used not only in the combination stated in each case, but also in other combinations or in isolation without departing from the scope of the present invention.

Preferred examples of embodiment of the invention are represented in the drawings and will be explained in greater detail in the following description, wherein the same reference numbers relate to the same or similar or functionally identical components.

BRIEF DESCRIPTION OF THE DRAWINGS

In the figures, in each case diagrammatically.

DETAILED DESCRIPTION

Figure 1:
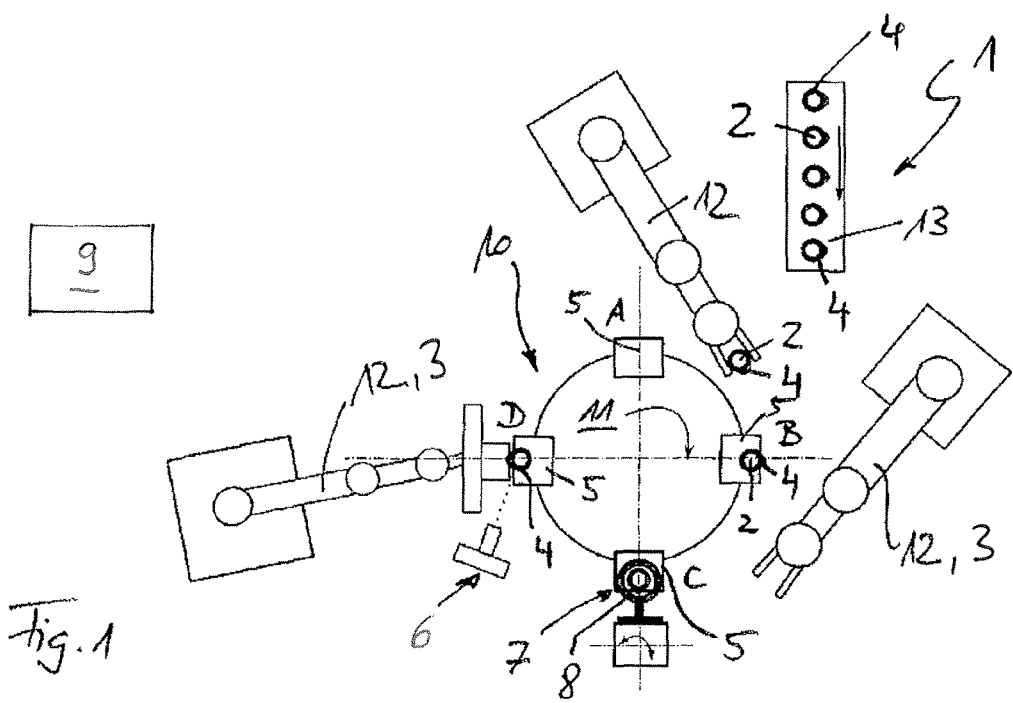
FIG. 1 shows a plan view of the device according to the invention.
Figure 2A:
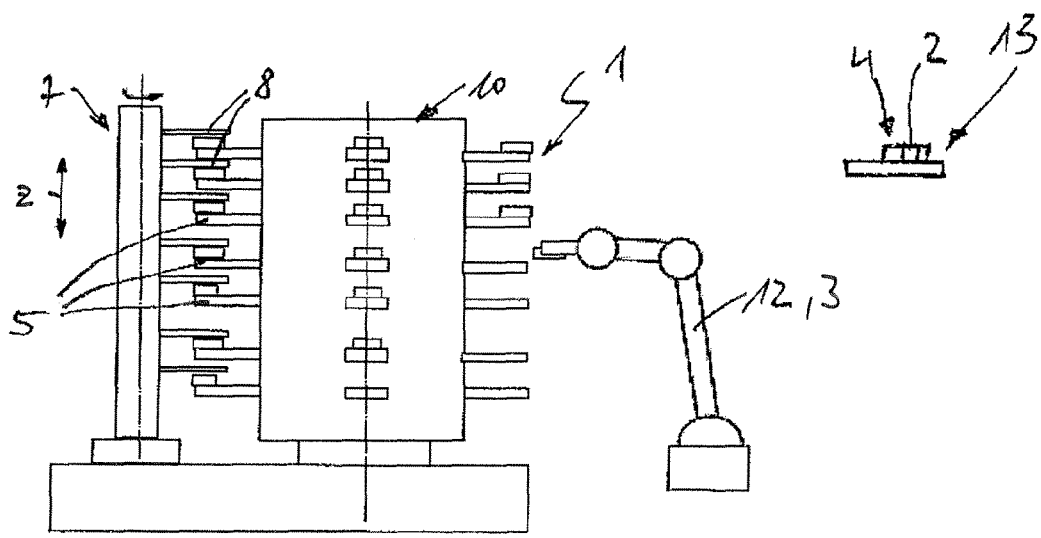
FIG. 2A-2C show various process steps in the production of a control shaft.
Figure 2B:
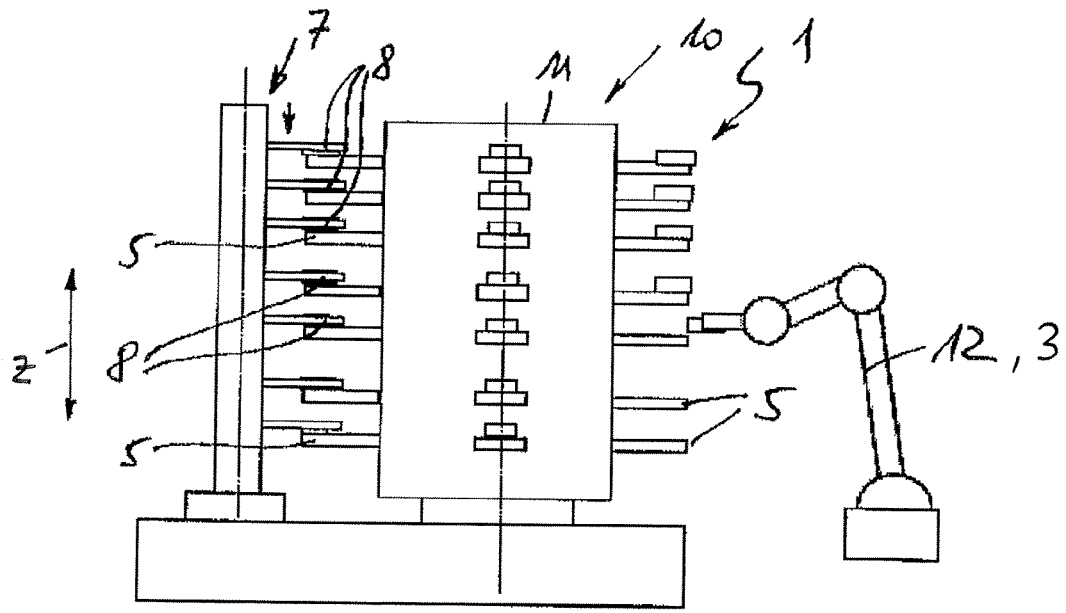
Figure 2C:
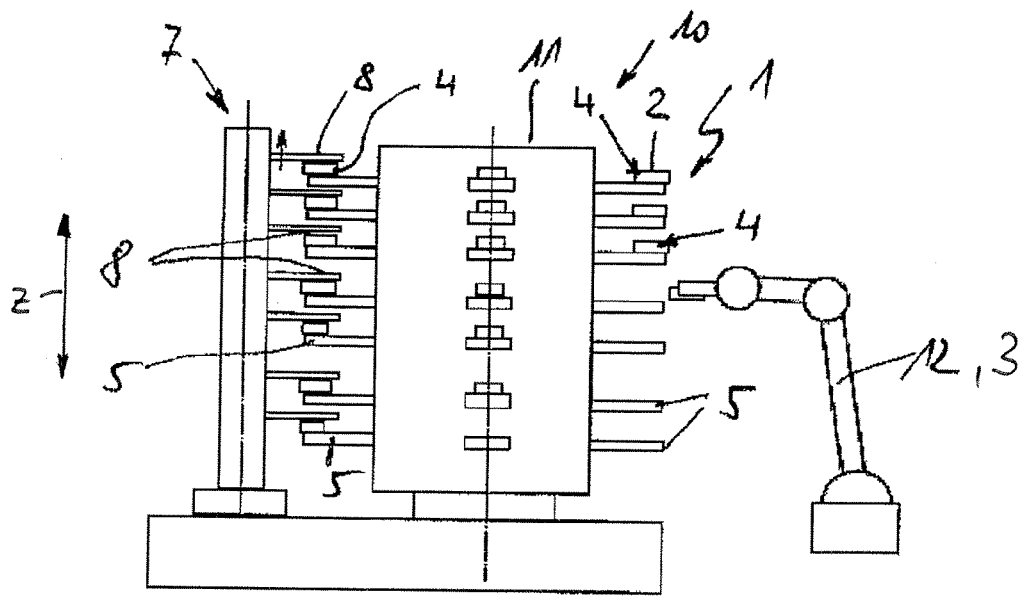

According to FIGS. 1 and 2, a device 1 according to the invention for heating a plurality of functional elements 4 each comprising a cutout 2 for a shaft, for example cams, balancing masses, gearwheels and/or bearings, comprises a plurality of holding balconies 5, which are each intended for a functional element 4 and which are disposed vertically above one another, as can clearly be seen in FIG. 2A-2C. According to the invention, device 1 comprises a plurality of workstations A, B, C, D (see FIG. 1), i.e. at least one loading station A, B, at least one heating station C and an unloading station D. Only three or more than four workstations can of course also be provided. Holding balconies 5 are adjustable individually in the z direction, i.e. vertically, wherein holding balconies 5 have a greater spacing in loading stations A, B and in unloading station D than in the at least one heating station C. In addition, an induction heating device 7 is provided, which comprises an individual accommodation element 8 for each functional element 4 to be heated, said accommodation elements being jointly adjustable in the z direction. An inner contour of respective accommodation element 8 can be constituted essentially complementary to an outer contour of respective functional element 4 to be heated, so that each functional element 4 can be accommodated in an associated accommodation element 8 for the inductive heating, in particular with a precise fit and with little play (see also FIG. 3). In the simplest case of embodiment, accommodation elements 8 can of course also be constituted as induction rings, which can be placed over functional element 4 to be heated, but which do not have an exactly precise fit with the outer contour of the latter. This offers the great advantage that different functional elements can be heated with such accommodation elements.

Induction heating device 7 comprises a number of accommodation elements 8 corresponding to the number of holding balconies 5, said accommodation elements preferably being adjustable jointly, i.e. simultaneously. At least one induction coil is disposed in each of these accommodation elements 8, said induction coil enabling inductive heating of functional element 4 accommodated therein. A plurality of induction coils can of course also be disposed in each accommodation element 8, as a result of which zonally different heating of functional elements 4 would be possible.

If FIGS. 1 and 2 are considered, it can be seen that device 1 is constituted as a rotary transfer system 10 and comprises a rotary table 11 with four workstations A, B, C and D. In the present case, a first and a second workstation A, B are constituted as loading stations, so that respective holding balconies can be occupied there with functional elements 4 removed from a magazine 13 by means of suitable loading devices 12, for example robots 3. The two loading stations A, B can of course also be combined in a single station, so that in this case rotary table 11 would comprise only three workstations. Functional elements 4 are aligned in holding balconies 5 in the at least one unloading station D in the z direction and in the angular orientation corresponding to the subsequent jointing position.

Purely theoretically, device 1 can also be constituted as a rotary transfer system 10 and can comprise five workstations, whereof at least two workstations are constituted as loading stations (A, B) or as heating stations (C). Equally in the case of a rotary transfer system with four workstations (A, B, C, D), two heating stations (C), i.e. a preliminary heating station and a main heating station, can be provided.

Moreover, device 1 according to the invention comprises a measuring device 6 (see FIG. 1), in particular an infrared measuring device, by means of which a temperature of functional elements 4 can be determined. Whether the subsequent thermal jointing process is then carried out depends on the temperature values ascertained by measuring device 6, so that a jointing process that is lacking in terms of quality due to diverging temperatures can be prevented.

Generally, the heating of functional elements 4 each comprising a cutout 2, for example cams, balancing masses, gearwheels and/or bearings, takes place by means of device 1 as follows:

Device 1 according to the invention is first loaded, corresponding to FIG. 2A, in workstations A and B by means of a suitable loading device 12, for example a robot 3, wherein functional elements 4 to be heated are removed by the latter from magazine 13 and placed on corresponding holding balconies 5 of device 1, i.e. in the present case rotary table 11. They are of course suitably fixed there by means of a fixing device (not shown), for example a gripping device, in particular with regard to their rotation angle position. As can clearly be seen from FIG. 2A, holding balcony 5 to be loaded with respective functional element 4 has a greater vertical spacing, i.e. a spacing in the z direction, with respect to an adjacent holding balcony 5 than remaining holding balconies 5, in order to facilitate the insertion of functional element 4.

According to FIG. 2B, the loading of holding balconies 5 with functional elements 4 to be heated also takes place by means of loading device 12, wherein accommodation elements 8 of induction heating device 7 are simultaneously moved downwards in workstation C, as a result of which functional elements 4 placed on holding balconies 5 enter into accommodation elements 8 of induction heating device 7. Heating of functional elements 4 takes place in this stage and, according to the invention, heating of functional elements 4 alone and not of holding balconies 5 as well in an undesirable manner. Before the rotation of functional elements 4 into heating station C, holding balconies 5 are moved together in the z direction, as a result of which an extremely compactly constituted and energy-efficient heating station C can be created.

Once a predefined heating time or a predefined heating power to be introduced is reached, accommodation elements 8 are again moved simultaneously upwards according to FIG. 2C, as a result of which functional elements 4 exit from accommodation elements 8. Heated functional elements 4 are then swivelled into workstation D by rotating rotary table 11 and are removed there and fed to a further jointing device 9. When rotary table 11 is rotated into unloading station D, holding balconies 5 are again moved apart in the z direction, i.e. in the vertical direction, as a result of which robot 3 can more easily remove heated functional elements 4. All holding balconies 5 can be moved apart simultaneously, or only those on which functional element 4 to be removed lies.

The invention claimed is:

1. A device for heating a plurality of receiving elements comprising:
    a plurality of holding balconies disposed above one another along an axis and each associated with a respective receiving element having a cutout for a shaft;
    a plurality of workstations including at least one loading station, at least one heating station and at least one unloading station;
    the plurality of holding balconies are individually adjustable in an axial direction of the axis relative to one another;
    the plurality of holding balconies having a greater spacing in the axial direction with respect to one another in the at least one loading station and the at least one unloading station than in the at least one heating station; and
    an induction heating device including a plurality of accommodation elements jointly adjustable in the axial direction wherein a respective accommodation element of the plurality of accommodation elements is associated with each receiving element to be heated, wherein a number of the plurality of accommodation elements corresponds to a number of the plurality of holding balconies.

2. The device according to claim 1, further comprising at least one induction coil disposed in each of the plurality of accommodation elements.

3. The device according to claim 2, further comprising a rotary table rotatable about the axis, wherein the plurality or workstations are operatively connected to the rotary table.

4. The device according to claim 3, wherein the plurality of workstations includes at least four workstations and wherein at least two workstations of the at least four workstations are configured as a loading station.

5. The device according to claim 4, further comprising at least one loading device for loading the plurality of holding balconies with the respective receiving element.

6. The device according to claim 2, further comprising a measuring device for determining a temperature of the receiving element.

7. The device according to claim 2, wherein an inner contour of the respective accommodation element is structured complementary to an outer contour of the respective receiving element to be heated, so that each receiving element can be disposed in the respective accommodation element for inductive heating.

8. The device according to claim 1, further comprising a rotary table for rotating the plurality of workstations about the axis.

9. The device according to claim 8, wherein the plurality of workstations includes at least four workstations, and wherein at least two workstations of the at least four workstations are configured as a loading station.

10. The device according to claim 1, wherein an inner contour of the respective accommodation element is structured essentially complementary to an outer contour of the respective receiving element to be heated, so that each receiving element can be disposed in the respective accommodation element for inductive heating.

11. The device according to claim 1, further comprising at least one loading device for loading the plurality of holding balconies with the respective receiving element.

12. The device according to claim 11, wherein the at least one loading device includes a robot.

13. The device according to claim 1, further comprising a measuring device for determining a temperature of the receiving elements.

14. The device according to claim 13, wherein the measuring device includes an infrared measuring device.

15. The device according to claim 1, wherein the plurality of receiving elements include at least one of a cam, a balancing mass, a gearwheel and a bearing.

16. The device according to claim 1, wherein the axis is oriented vertically and the axial direction corresponds to a z direction.

17. A method for heating a receiving element for a thermal joining process, comprising:
   providing a plurality of holding balconies disposed one above another along an axis;
   placing a plurality of receiving elements disposed in at least one loading station into a corresponding holding balcony of the plurality of holding balconies;
   moving the plurality of holding balconies having a respective receiving element together in an axial direction, and displacing the plurality of receiving elements into at least one heating station;
   inductively heating the plurality of receiving elements in an associated accommodation element of an induction heating device, wherein inductively heating the plurality of receiving elements includes placing the associated accommodation element of the induction heating device over each receiving element;
   measuring a temperature of the plurality of receiving elements;
   removing the associated accommodation element from the plurality of receiving elements;
   displacing the plurality of receiving elements into at least one unloading station; and
   moving the plurality of holding balconies apart and removing the plurality of receiving elements in the at least one unloading station.

18. The method according to claim 17, wherein displacing the plurality of receiving elements includes swiveling the plurality of receiving elements by a rotary table.

19. The method according to claim 17, wherein the plurality of receiving elements include at least one of a cam, a balancing mass, a gearwheel and a bearing.

20. A heating device, comprising:
   a plurality of holding balconies disposed above one another along an axis and each associated with a respective receiving element having a cutout for a shaft;
   a plurality of workstations including at least one loading station, at least one heating station and at least one unloading station;
   a rotary table for rotating the plurality of workstations about the axis;
   an induction heating device including a plurality of accommodation elements respectively associated with each receiving element;
   the plurality of holding balconies are individually adjustable in an axial direction of the axis relative to one another;
   the plurality of holding balconies having a greater spacing in the axial direction with respect to one another in the at least one loading station and the at least one unloading station than in the at least one heating station; and
   the plurality of accommodation elements are jointly adjustable in the axial direction, wherein a number of the plurality of accommodation elements corresponds to a number of the plurality of holding balconies.

* * * * *